US007708664B2

(12) United States Patent
Schumacher et al.

(10) Patent No.: US 7,708,664 B2
(45) Date of Patent: May 4, 2010

(54) DRIVE UNIT FOR A MOWING SICKLE

(75) Inventors: Günter Schumacher, Raiffeisenstrasse 10, 57612 Eichelhardt (DE); Gustav Schumacher, Eichelhardt (DE)

(73) Assignee: Gunter Schumacher (DE)

( * ) Notice: Subject to any disclaimer, the term of this patent is extended or adjusted under 35 U.S.C. 154(b) by 630 days.

(21) Appl. No.: 11/544,354

(22) Filed: Oct. 9, 2006

(65) Prior Publication Data

US 2007/0087891 A1    Apr. 19, 2007

(30) Foreign Application Priority Data

Oct. 10, 2005    (DE) .................. 10 2005 048 766

(51) Int. Cl.
F16H 1/28    (2006.01)
(52) U.S. Cl. .......................... 475/11; 56/297
(58) Field of Classification Search .................. 475/11, 475/331; 56/297, 293, 275
See application file for complete search history.

(56) References Cited

U.S. PATENT DOCUMENTS 2,185,155 A * 12/1939 Meeker et al. ................ 475/11
4,446,683 A * 5/1984 Rempel et al. ................ 56/297
4,813,291 A    3/1989 Schumacher, II et al.
6,273,214 B1    8/2001 Schumacher

FOREIGN PATENT DOCUMENTS

| DE | 3207418 | 9/1982 |
|---|---|---|
| DE | 39 31 736 | 11/1991 |
| DE | 36 15 058 | 2/1994 |
| EP | 1 332 665 | 6/2003 |
| EP | 1 340 419 | 9/2003 |
| EP | 1 535 507 | 6/2005 |
| GB | 774588 | 5/1957 |
| GB | 972261 | 10/1964 |

* cited by examiner

Primary Examiner—David D Le
Assistant Examiner—Derek D Knight
(74) Attorney, Agent, or Firm—Harness, Dickey & Pierce, P.L.C.

(57) ABSTRACT

A drive unit for oscillatingly driven mowing sickles has a first transmission unit {1} with a first housing (5) defining a first axis (6). A rotor (7) is rotationally supported in the first housing (5) around the first axis (6). A first internal gear wheel (10) is fixed in the first housing (5) and provided with internal teeth. A toothed pinion (14) is rotationally supported in the rotor (7) around a second axis (12). The second axis (12) is radially off-set to the first axis (6). The toothed pinion (14) forms the output element of the drive unit and meshes with the first internal gear wheel (10). A second transmission unit (2) has an output (34) non-rotationally connected to the rotor (7) of the first transmission unit (1). The second transmission unit (2) is formed as a step-down gear. A motor (4), with an output shaft (45), rotationally drives the second transmission unit (2). The rotational speed N1 is reduced by the second transmission unit (2), formed as a step-down gear, to the rotational driving speed N2 of the first transmission unit (1).

16 Claims, 2 Drawing Sheets

DRIVE UNIT FOR A MOWING SICKLE

CROSS-REFERENCE TO RELATED APPLICATIONS

Figure 1:
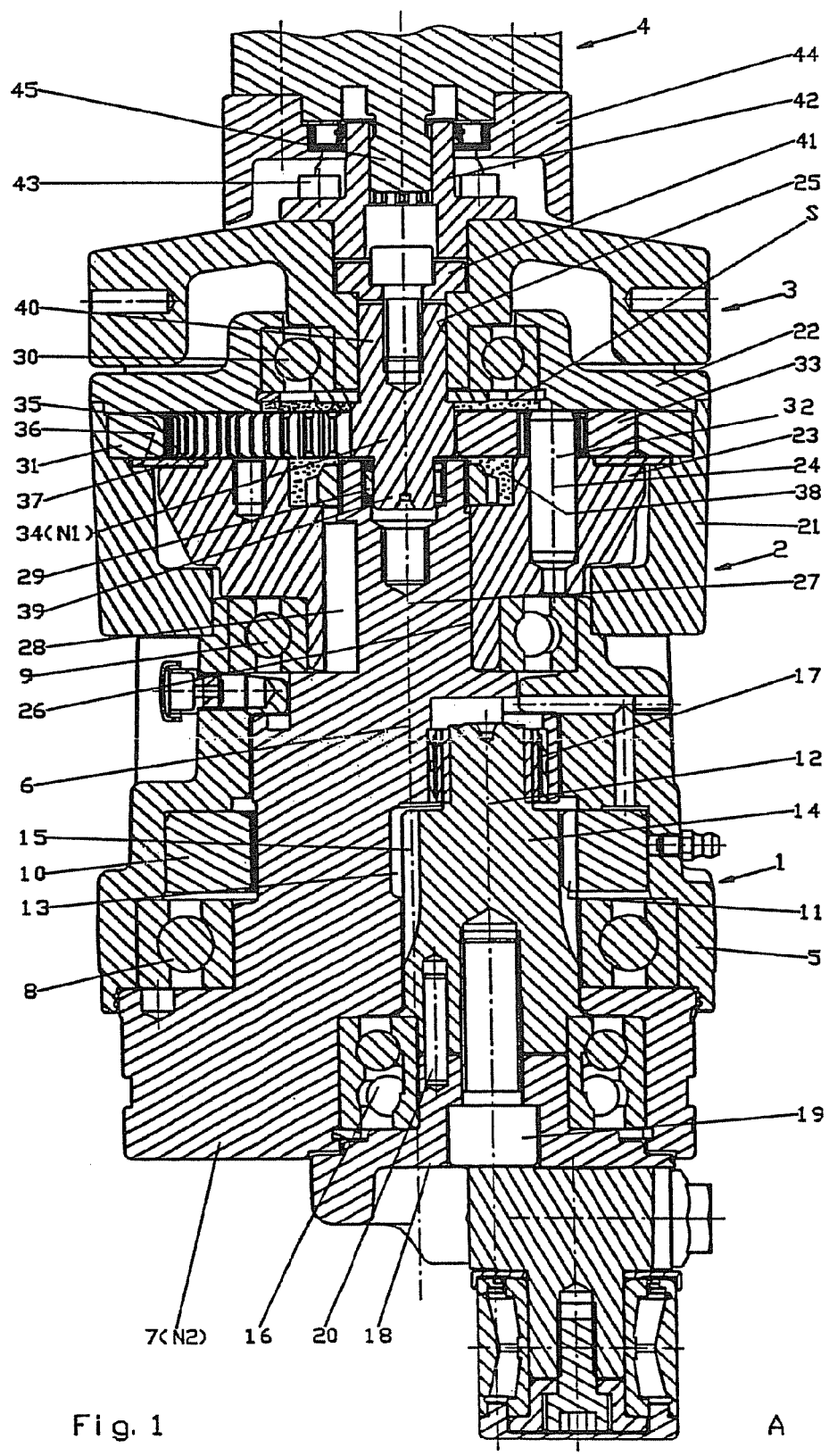

This application claims priority to German Patent Application No. 102005048766.1, filed Oct. 10, 2005, which application is herein expressly incorporated by reference.

FIELD

The disclosure relates to a drive unit for oscillatingly driven mowing sickles. For example, these devices are used in harvesting machines, like combine-harvesters or similar machines. These mowing sickles have a working width in the order of 6 to 18 meters.

BACKGROUND

These mowing sickles are driven by drives of different construction. Especially advantageous in these large mowing widths mowing sickles, where high power is required, are drive units which include a transmission unit. The transmission unit converts the rotational movement directly into a reciprocating movement. The transmission units are directly coupled to the mower head of the mowing sickle to provide this oscillating movement.

One such transmission unit is described in DE 36 15 058 C2. The unit has a housing, which forms a first axis. The transmission unit includes a rotor, which is rotationally supported in the housing around the first axis. The rotor is driven by a power source. An internally toothed gear wheel is stationary attached in the housing.

The gear does not rotate in relation to the housing. The rotor is held in bearings in the housing. A toothed pinion gear wheel is rotationally supported around a second axis on the rotor itself. The second axis is radially off-set to the first axis. The toothed pinion gear forms the driving element of the transmission and meshes with the internally toothed gear wheel.

In practice, such a transmission unit is, for example, driven via a belt drive by a motor. Additionally, a flywheel mass is often provided in order to be able to also handle suddenly appearing loads.

Such drive units require, however, a large space. If a hydraulic motor is arranged directly onto the transmission unit, a bulky construction size results. However, hydraulic motors are suitable in connection with the above described transmission unit for only low rotational speeds. Thus, due to the high consumption volume, the hydraulic motors are only suitable for harvesting machines which have an extensive hydraulic system.

The disclosure provides a drive unit for an oscillatingly driven mowing sickle which has a small space requirement. Thus, the usable working width is more advantageous and is suitable for high power requirements.

SUMMARY

According to the disclosure, a drive unit comprises a first transmission unit. The first transmission unit has a first housing that forms a first axis. A rotor is rotationally supported in the first housing around the first axis. A first internal gear wheel is retained in the first housing and provides internal teeth. A pinion is rotationally supported on the rotor around a second axis. The second axis is radially off-set to the first axis. The pinion forms the output element of the drive unit and meshes with the first internal gear wheel. A second transmission unit is non-rotationally connected to the rotor of the first transmission unit. The second transmission unit is formed as a step-down gear. A motor, with an output shaft, rotationally drives the second transmission unit. The rotational speed is reduced by the second transmission unit, formed as a step-down gear, to the rotational driving speed of the first transmission unit.

An advantage of the drive unit, due to the second transmission unit, is that motors can be used which have a distinctly reduced power compared to the constructions with only one transmission unit. Namely, fast running hydraulic motors or electro motors can be used that have rotational drive speed in the range of 3000 to 4000 (maximal) revolutions per minute. The second transmission unit can vary in design. It can be a spur gear transmission or a planetary gear transmission. The second transmission unit, due to its design, effectively converts high rotational drive speed into a lower rotational speed, which can be used to drive the first transmission unit. In the second transmission unit, the gear ratio between the toothed pinion gear and the rotor is selected so that, on the driving side, a linear movement is provided. The linear movement directly drives the mowing sickle in a reciprocating manner.

An especially advantageous construction and mode of operation is achieved by a structure where the second transmission unit comprises a planet carrier non-rotationally connected to the rotor of the first transmission unit. The planet carrier rotates with the rotor around the first axis and carries at least one planet gear. The at least one planet gear includes teeth on its outside and is rotationally supported on the planet carrier around a third axis. The third axis is arranged radially off-set to the first axis. A second internal gear wheel is provided with internal teeth. The second gear wheel is stationarily held and it meshes with the at least one planet gear. A sun gear meshes with the at least one planet gear. The output shaft of the motor rotationally drives the sun gear of the second transmission unit.

An advantage of this construction is that fast running hydraulic motors or electro motors that have small construction volumes can be used. The additional second transmission unit, by means of its construction, saves space and can be positively connected to the first transmission unit. Also, an advantage is that the motor can be directly integrated into the drive unit. Preferably, three planet gears are provided.

Further, the second transmission unit has a second housing which is attached onto the first housing. The second housing accommodates the planet carrier with the at least one planet gear, the second internal gear wheel and the sun gear.

Here, an advantage is that the separate housing enables the second transmission unit to use the first transmission unit, for example, in combination with normal common drives. The drives are dimensioned so that power is provided which is sufficient to directly drive the mowing sickle by the first transmission unit.

It is also possible for the second transmission unit to have a housing portion that is integrally formed with the first housing. The housing portion accommodates the planet carrier with the at least one planet gear, the sun gear and the second internal gear wheel.

An advantage is that in the drive unit, the second transmission unit is lubricated by a lubricating grease. A separating disk is arranged between the planet carrier and the second housing or housing portion which accommodates the planet carrier. In a direction towards the first housing, the separating disk seals the chamber accommodating the second internal gear wheel, the at least one planet gear and the sun gear. Also the first transmission unit can be lubricated by grease. Thus, between the two transmission units no perfect seal is necessary, which would be necessary for different lubricants, such as oil and lubricating grease.

In this case, lubricating grease, such as a lithium base saponified grease, can be employed which is commonly used in mechanical engineering applications.

According to the disclosure, cooling of the motor, especially by oil cooling, is not necessary. Also, they cannot be practically provided since hydraulic motors can be used which only necessitate small oil consumption to operate the drive unit. The separating disk ensures that the lubricating grease remains in the area or space where the gears mesh and the chamber where the second internal gear wheel, the at least one planet gear and the sun gear are arranged.

The lubricant cannot escape in the direction to the first transmission unit or to the outside. Preferred is an arrangement where the separating disk is arranged between the second housing or the housing portion and the second internal gear wheel and the planet carrier. Thus, the gap between the planet carrier and the second housing is bridged in the radial direction relative to the first axis. Further, a sealed chamber is formed with the lid of the second housing and the second housing.

The separating disk is non-rotationally held on the second housing or on the housing portion, respectively. The relative movement takes place in relation to the planet carrier. This carrier rotates relative to the separating disc.

Furthermore, a flywheel is arranged between the motor and the sun gear of the second transmission unit.

If the spacial conditions allow it, it is also possible that the second transmission unit comprises a spur gear. The spur gear is non-rotationally connected to the rotor of the first transmission unit. The spur gear rotates with the rotor around the first axis. A spur pinion gear meshes with the spur gear and rotates around a fourth axis arranged parallel to the first axis. The spur gear is driven by the motor. Accordingly, two ways are provided to arrange the motor.

A first embodiment provides that the motor is arranged parallel to and next to the first transmission unit. In this connection, additionally a flywheel can be provided connected to the toothed pinion gear to rotate with it. The flywheel is arranged on the side of the second transmission unit and of the motor facing away from the first transmission unit.

A second arrangement provides that the motor is coupled parallel to the second transmission unit. The motor faces away from the first transmission unit. Here, a flywheel is coupled to the spur pinion gear to rotate with it. The flywheel is arranged on a side of the second transmission unit facing the first transmission unit next to the first transmission unit.

In both embodiments it is possible that the second transmission unit has a second housing. The second housing is attached on the first housing of the first transmission unit or forms at least a partial portion of the unit.

For all embodiments, the motor can be formed as a fast running hydraulic motor or electromotor. Thus a space saving construction is achieved. The flywheel provides the necessary power, when load peaks are produced.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
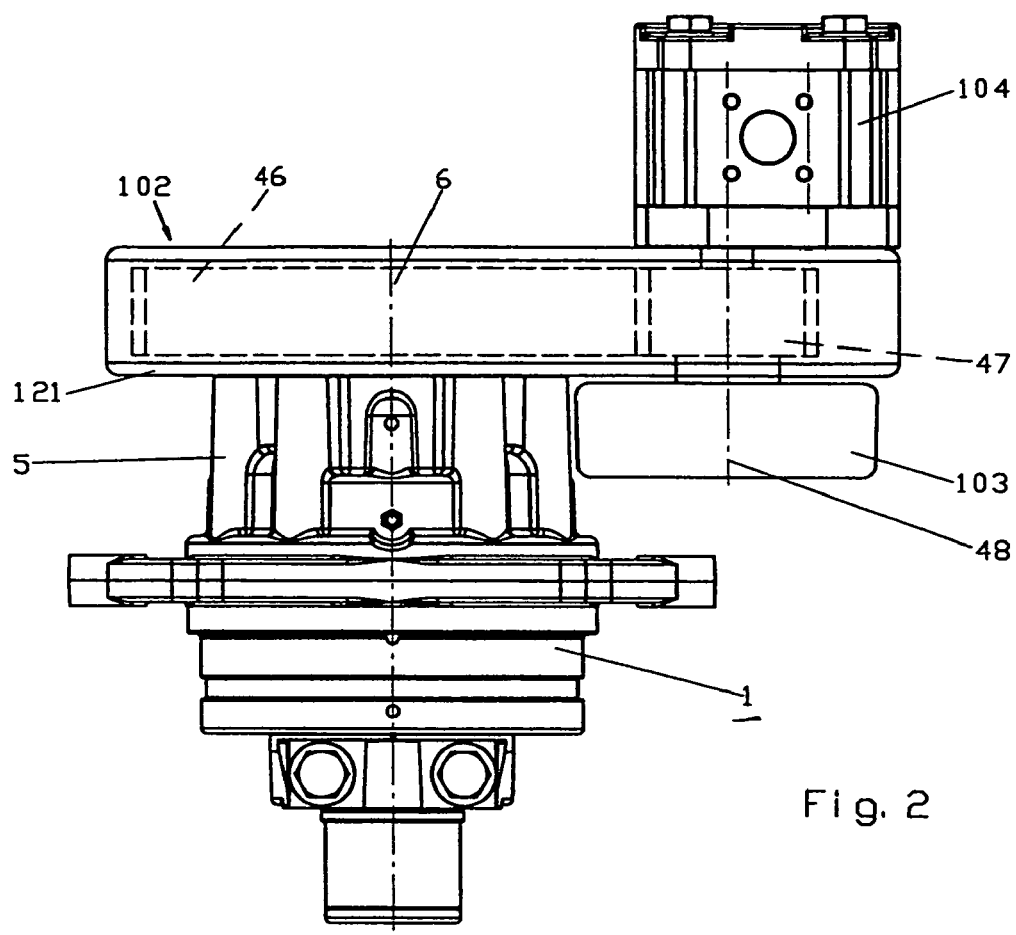
Figure 3:
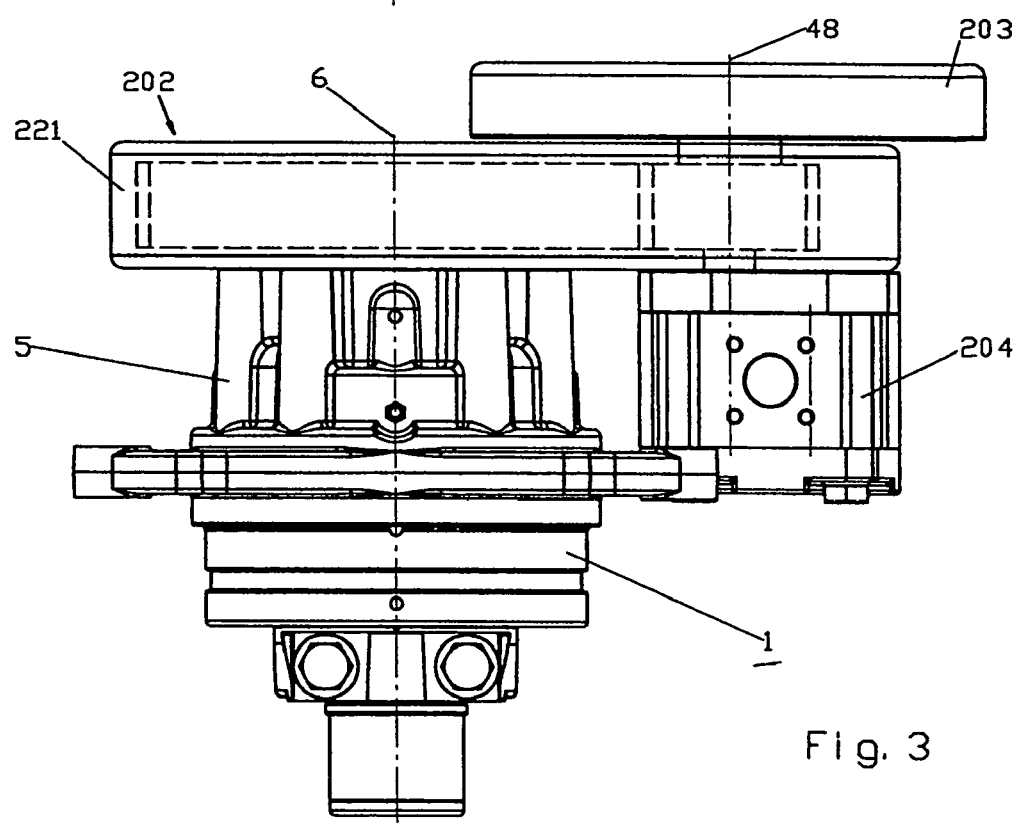

FIG. 1 is a sectional view with the motor arranged centrally above the second transmission unit which is represented by a planet gear, FIG. 2 is a schematic view of a second embodiment with the transmission unit as a spur gear and the motor arranged parallel off-set to the first transmission unit facing away from the first transmission unit; and FIG. 3 is a schematic view of a third embodiment with the second transmission unit as a spur gear and the motor arranged parallel off-set to the first transmission unit and next to the first transmission unit.

DETAILED DESCRIPTION

The following description is merely exemplary in nature and is not intended to limit the present disclosure, application, or uses.

FIG. 1 shows a sectional view along the first axis of the drive unit.

The first embodiment of a drive unit according to the disclosure includes a first transmission unit 1 followed by a second transmission unit 2. A fast running hydraulic motor 4 is provided to drive the second transmission unit 2. The hydraulic motor 4, however, can be substituted by an electromotor. A flywheel 3, in the form of a centrifugal mass, is arranged between the hydraulic motor 4 and the second transmission unit 2. The flywheel represents the input transmission.

The first transmission unit 1 has a first housing 5 which defines a first axis 6. In the first housing 5, a rotor 7 is supported by a first bearing 8 and a second bearing 9. The bearings 8, 9 are distanced from one another and are rotationally positioned around the first axis 6. The bearings 8, 9 are in the form of rolling member bearings.

A first internal gear wheel 10 is arranged in the first housing 5. The gear wheel 10 encloses a portion of the rotor 7 and has internal teeth 11. The rotor 7 is centered on the first axis 6. A recess 13 is formed in the rotor offset from the first axis 6 and is open towards the circumference of the rotor 7. A pinion 14 with teeth 15 is accommodated in the recess 13. A third bearing 16 and a fourth bearing 17 support the pinion 14. The bearings 16, 17 are distanced from one another and are in the form of rolling member bearings rotational around a second axis 12. The second axis 12 is radially off-set to the first axis 6 and extends parallel to it. The teeth 15 of the pinion 14 mesh with the teeth 11 on the internal circumference of the first internal gear wheel 10. The pinion 14 represents the output element. An output element 18 is fixed by a screw and is non-rotationally connected to the pinion 14 by at least one pin 20. The output element 18 includes a journal-like element (not shown) which engages in a bore of a mowing head to drive the mowing sickle.

The second transmission unit 2 is connected to the first transmission unit 1 and is arranged in front of the first transmission unit. The second transmission unit 2 includes a second housing 21 securely connected, by means not shown in the drawing, for example screws, to the first housing 5 of the first transmission unit 1. Further an arrangement is possible where these two housings are formed integrally with one another and thus, the second housing 21, which in the present example is separate, would form a portion of the first housing 5. The second housing 21 is further closed by a lid 22. This closes the end of the second housing 21 distanced from the first housing 5.

The second bearing 9, which supports the bearing journal 27 of the rotor 7, at the same time serves to support the planet carrier 23. The planet carrier 23 has a bearing bore 26 which accommodates the bearing journal 27 of the rotor 7.

Three planet gears 33 are rotationally arranged, via bearing pins 32, on the planet carrier 23. The bearing pins 32 rest in bores in the planet carrier 23. The bearing pins 32 define third axes 24 of the planet gears 33. The third axes 24 are arranged radially off-set to the first axis 6. The planet gears 33 rotate around the third axes 24. A chamber 38 is formed between the lid 22, the planet carrier 23 and the second housing 21.

The planet gears 33, a second internal gear wheel 31, enclosing the planet gears 33, and a sun gear 34 are arranged in the chamber 38. The chamber 38 is sealed in the direction of the first transmission unit 1 by a separating disk 37. The separating disk 37 is held between an abutment face 36 on the second housing, and an abutment face 37 of the second internal gear wheel 31 and is additionally supported on an abutment face 35 on the planet carrier 23. Thus, the separating disk 37 seals the gap between the planet carrier 23 and the second housing 21. The separating disk 37 is, at the same time, non-rotationally held by a mechanism (not shown) which fixes the second internal gear wheel 31 in relation to the second gear housing 21. The mechanism may be a plurality of pins. However, a relative rotational movement is provided between the planet carrier 23 and the separating disk 37. The separating disk 37 seals the chamber 38. Also, grease S can seal the gaps in this area between the meshing area of the planet gears 33 with the internal teeth of the second internal gear wheel 31 as well as the external teeth of the sun gear 34. The grease S cannot escape from the intermediate spaces. Thus, a permanent lubrication of the second transmission unit 2 is provided.

The sun gear 34 has a first journal portion 39, which is rotationally accommodated relative to the rotor 7 by an interconnection of a fifth bearing 29 in a bore of the bearing journal 27 of the rotor 7. The planet carrier 23 is connected to the bearing journal 27 of the rotor 7, via a key 28, so that both rotate together.

The sun gear 34 has a second journal portion 40, which is accommodated in a bore 25 of the flywheel 3. The journal portion 40 is supported by a sixth bearing 30, together with the flywheel 3, in the lid 22 of the second transmission unit 2. The flywheel 3 is non-rotationally connected to the sun gear 34. This forms the transmission input for the second transmission unit 2. The second transmission unit 2 is driven at the rotational speed N1 by the hydraulic motor 4. The motor output shaft 45 is non-rotational connected to the flywheel 3 via a coupling sleeve 42. The coupling sleeve 42 is retained by screws 43 on the flywheel 3. The flywheel 3 is further securely connected to the sun gear 34 via a shaft to hub connection and by a locating disk 41. The locating disk 41 is retained by a screw which engages a threaded bore of the sun gear 34.

The hydraulic motor 4 rests on a bridge element 44 which is connected to the second housing 21 and bridges the flywheel 3. The fast running hydraulic motor 4, not shown in more detail, rotates at a high rotational speed N1 of approximately 4000 revolutions per minute. The motor 4 drives the sun gear 34 of the second transmission unit 2 with a rotational input speed of N1. This input speed N1 is stepped down by the second transmission unit 2 to a rotational speed N2. Rotational speed N2 forms the rotational input speed for the first transmission unit 1. This is the rotational speed N2, by which the rotor 7 is driven via the planet carrier 23, which represents the output element of the second transmission unit 2. The first transmission unit 1 converts the rotational movement of the rotor 2 into a linear movement of the output journal of the output element 18. The output element 18 is positively connected to the (not shown) mowing head of the mowing sickle, to reciprocatingly drive it.

Due to the special design of the second transmission unit 2 and especially its sealing, permanent lubrication is achieved. The second transmission unit is practically free of maintenance requirements. Only the first transmission unit 1 needs to be lubricated at desired intervals. Grease lubrication is also provided to lubricate the first transmission unit.

FIG. 2 shows another embodiment of a drive unit. The first transmission unit 1 in the embodiment of FIG. 2 corresponds to the construction of the transmission unit 1 of FIG. 1. Therefore, refer to the description of FIG. 1.

A second transmission unit 102 is coupled to the first transmission unit 1. The second transmission unit 102 is formed differently from the second transmission unit of FIG. 1. The second transmission unit 102 includes a second housing 121, which is securely connected to the first transmission unit 1, or can be at least partially a unit therewith. The second transmission unit 102 is formed as a spur gear arrangement. The spur gear arrangement has a gear 46 with external teeth. The gear 46 is non-rotationally connected to the first transmission unit 1 at the bearing journal 27 of FIG. 1, so that it can drive the rotor 7 of FIG. 1. The gear 46 is driven by teeth of a spur pinion gear 47. The pinion gear 47 is driven by a fast running motor 104, for example a hydraulic motor or an electromotor.

The rotational speed of the motor 104 is similar to that of the hydraulic motor described in connection with FIG. 1. The spur pinion gear 47 also has also external teeth that mesh with the gear 46, which has a larger diameter, so that a reduction of the rotational speed of the motor 104 is achieved. The spur pinion gear 47 rotates around a fourth axis 48, which also represents the drive axis of the motor 104.

It is visible, that the fourth axis 48 is radially off-set from the first axis 6. Furthermore, the motor 104 is arranged at that side of the second transmission unit 102, facing away from the first transmission unit 1. At the side of the second transmission unit 102, facing the first transmission unit 1, a flywheel 103 is arranged on the fourth axis 48. The flywheel 103 is connected to the spur pinion gear 47 in such a way, that it rotates with it.

FIG. 3 shows a third embodiment of a drive unit. This embodiment differs from the construction of FIG. 2 only by the arrangement of the motor 204 and the flywheel 203. The first transmission unit 1 again corresponds to the construction of the transmission unit 1, as described in detail in connection with FIG. 1. The arrangement of the second transmission unit 202 and its construction corresponds to that described in connection with FIG. 2, thus refer to the description of FIG. 2.

The motor 204 is arranged in a parallel off-set relation to the first axis 6. The motor 204 defines a drive axis, the fourth axis 48. The motor 204 is arranged, however, to the gearbox housing 221 at the side facing the first transmission unit 1. Thus, the motor 204 is arranged parallel off-set to the first transmission unit 1 with the first axis 6 beside the first transmission unit 1. The flywheel 203 is correspondingly arranged on the side of the housing 221 of the second transmission unit 202 facing away from the first transmission unit 1.

The description of the invention is merely exemplary in nature and, thus, variations that do not depart from the gist of the invention are intended to be within the scope of the inven-

What is claimed is:

1. A drive unit for oscillatingly driven mowing sickles comprising:
   a first transmission unit having a first housing defining a first axis, a rotor rotationally supported in the first housing around the first axis, a first internal gear wheel retained in the first housing, said first internal gear wheel providing internal teeth, a pinion rotationally supported in the rotor around a second axis, said second axis is radially off-set to the first axis, said pinion forms an output element of the drive unit and meshes with teeth of the first internal gear wheel;
   a second transmission unit having an output non-rotationally connected to the rotor of the first transmission unit, said output formed as a step-down gear;
   a motor having an output shaft rotationally driving the second transmission unit, said motor providing a rotational speed which is reduced by the second transmission unit, formed as a step-down gear, to a rotational driving speed of the first transmission unit;
   said second transmission unit further comprises a planet carrier, non-rotationally connected to the rotor of the first transmission unit and rotating with the rotor around the first axis and said planet carrier carries at least one planet gear with external teeth, said at least one planet gear is rotationally supported on the planet carrier around a third axis, said third axis is radially off-set to the first axis,
   a second internal gear wheel stationary held and provided with internal teeth which mesh with said at least one planet gear;
   a sun gear meshing with said at least one planet gear; and
   the output shaft of the motor rotationally drives the sun gear of the second transmission unit.

2. The drive unit according to claim 1, wherein the second transmission unit has a second housing attached on the first housing and said second housing accommodates the planet carrier with the at least one planet gear, the second internal gear wheel and the sun gear.

3. The drive unit according to claim 1, wherein the second transmission unit has a housing portion which is formed integrally with the first housing and said housing portion accommodates the planet carrier with the at least one planet gear, the sun gear and the second internal gear wheel.

4. The drive unit according to claim 1, wherein the second transmission unit is lubricated by a lubricating grease and a separating disk is accommodated between the planet carrier and the second housing or housing portion in the direction towards the first housing sealing a chamber, which accommodates the planet carrier, the second internal gear wheel, the at least one planet gear and the sun gear.

5. The drive unit according to claim 4, wherein the separating disk is arranged between the second housing and the second internal gear wheel and the planet carrier.

6. The drive unit according to claim 4, wherein the separating disk is non-rotationally held on the second housing or on the housing portion.

7. The drive unit according to claim 2, wherein the second housing or the housing portion are closed, away from the first transmission unit, by a lid.

8. The drive unit according to claim 1, wherein a flywheel is arranged between the motor and the sun gear of the second transmission unit.

9. The drive unit according to claim 1, wherein the second transmission unit comprises a spur gear, which is non-rotationally connected to the rotor of the first transmission unit and said spur gear rotates with the rotor around the first axis and a spur pinion gear, meshing with the spur gear and which rotates around a fourth axis arranged parallel to the first axis and is driven by the motor.

10. The drive unit according to claim 9, wherein the motor is arranged parallel to and next to the first transmission unit.

11. The drive unit according to claim 10, wherein a flywheel is provided connected to the spur pinion gear to rotate therewith and said flywheel is arranged on a side of the second transmission unit and of the motor facing away from the first transmission unit.

12. The drive unit according to claim 9, wherein the motor is coupled in parallel to the second transmission unit and facing away from the first transmission unit.

13. The drive unit according to claim 12, wherein a flywheel is provided coupled to the spur pinion gear to rotate therewith, and said flywheel is arranged on the side of the second transmission unit, facing the first transmission unit, next to the first transmission unit.

14. The drive unit according to claim 9, wherein the second transmission unit has a second housing attached to the first housing of the first transmission unit or forms at least a partial portion of the unit.

15. The drive unit according to claim 1, wherein the motor is a hydraulic motor or an electromotor.

16. The drive unit according to claim 2, wherein the second transmission unit has a second housing attached on the first housing and said second housing accommodates the planet carrier with the at least one planet gear, the second internal gear wheel and the sun gear.

* * * * *